United States Patent
Eismann

(10) Patent No.: US 11,288,983 B2
(45) Date of Patent: Mar. 29, 2022

(54) SHIP MODEL

(71) Applicant: EISMANN INNOVATIONS GMBH, Münster (DE)

(72) Inventor: Joachim Eismann, Münster (DE)

(73) Assignee: Eismann Innovations GmbH, Münster (DE)

( * ) Notice: Subject to any disclaimer, the term of this patent is extended or adjusted under 35 U.S.C. 154(b) by 302 days.

(21) Appl. No.: 16/334,830

(22) PCT Filed: Sep. 19, 2017

(86) PCT No.: PCT/EP2017/001110
§ 371 (c)(1),
(2) Date: Sep. 19, 2019

(87) PCT Pub. No.: WO2018/054531
PCT Pub. Date: Mar. 29, 2018

(65) Prior Publication Data
US 2020/0020250 A1    Jan. 16, 2020

(30) Foreign Application Priority Data
Sep. 20, 2016    (DE) .................. 10 2016 011 279.4

(51) Int. Cl.
*G09B 25/00*    (2006.01)
*B63B 7/04*    (2020.01)
*B63B 35/00*    (2020.01)
*A63J 13/00*    (2006.01)

(52) U.S. Cl.
CPC ............... *G09B 25/00* (2013.01); *B63B 7/04* (2013.01); *B63B 35/00* (2013.01); *A63J 13/00* (2013.01)

(58) Field of Classification Search
CPC . G09B 9/02; G09B 9/06; G09B 23/12; G09B 25/00; A63H 23/00; A63H 23/02; A63H 23/10; B63B 7/00; B63B 7/04; B63B 2007/003
See application file for complete search history.

(56) References Cited

U.S. PATENT DOCUMENTS

| 1,462,800 | A | | 7/1923 | Clemmer | |
|---|---|---|---|---|---|
| 2,533,220 | A | | 12/1950 | Carter | |
| 2,708,810 | A | * | 5/1955 | Canto | A63H 23/02 446/161 |
| 3,292,303 | A | * | 12/1966 | Fors | A63H 23/02 446/161 |
| 3,451,159 | A | * | 6/1969 | Springfors | A63H 23/02 446/161 |

(Continued)

FOREIGN PATENT DOCUMENTS

| DE | 10142447 | A1 | | 4/2003 | |
|---|---|---|---|---|---|
| ES | 2333285 | | * | 2/2010 | B63B 3/08 |

(Continued)

OTHER PUBLICATIONS

International Search Report dated Dec. 1, 2017; International Application No. PCT/EP2017/001110, filed Sep. 19, 2017.

*Primary Examiner* — Kurt Fernstrom
(74) *Attorney, Agent, or Firm* — Dinsmore & Shohl LLP

(57) ABSTRACT

A ship model having an elongated ship body configured in such a way that the ship body is divided over its longitudinal extent (L) into a plurality of segments that can move relative to one another and can be lowered below a water surface.

22 Claims, 16 Drawing Sheets

(56) References Cited

U.S. PATENT DOCUMENTS

| | | | | |
|---|---|---|---|---|
| 6,022,261 A | * | 2/2000 | Zhu | A63H 23/02 |
| | | | | 446/161 |
| 6,115,974 A | | 9/2000 | Milanian | |
| 6,948,443 B1 | * | 9/2005 | Kopylov | B63B 7/04 |
| | | | | 114/353 |
| 2009/0081920 A1 | * | 3/2009 | Strebeigh | A63H 23/02 |
| | | | | 446/160 |
| 2019/0100289 A1 | * | 4/2019 | Maione | A01K 41/065 |

FOREIGN PATENT DOCUMENTS

| | | |
|---|---|---|
| ES | 2333285 A1 | 2/2010 |
| GB | 1096359 A | 12/1967 |
| JP | H1162006 A | 3/1999 |
| WO | 2005047096 A1 | 5/2005 |

\* cited by examiner

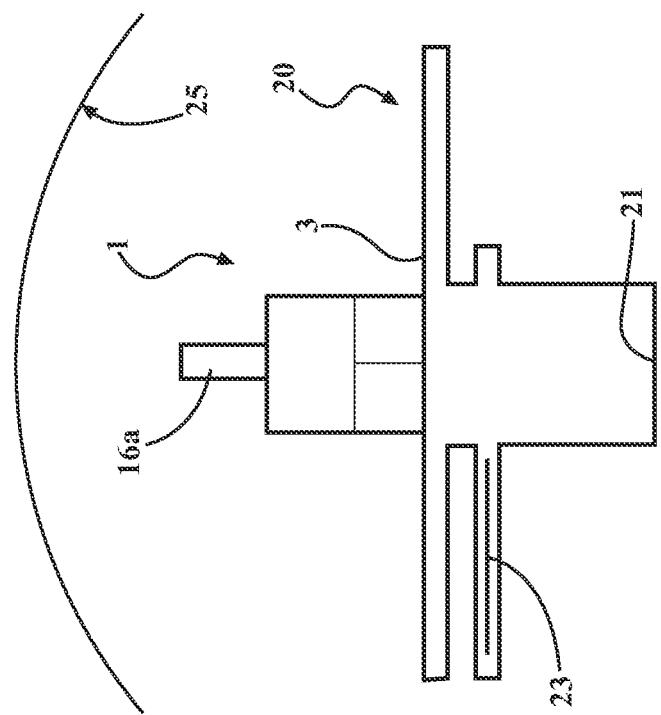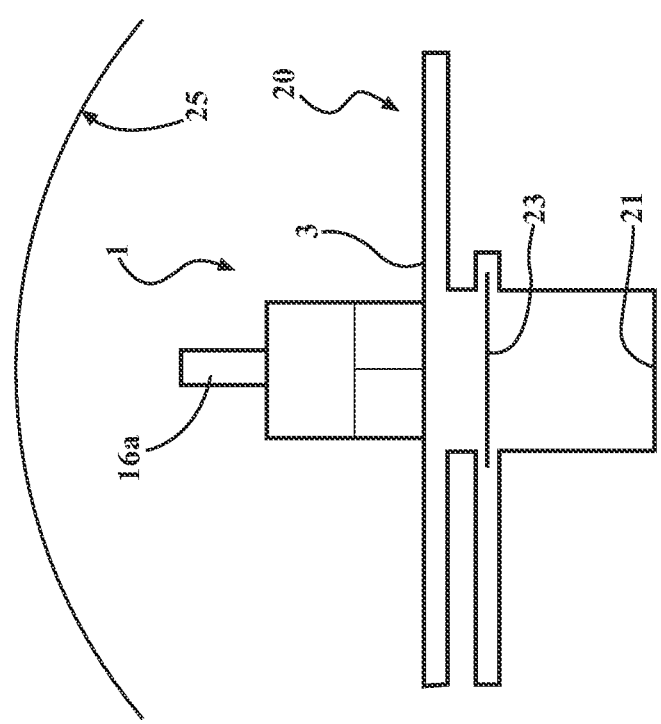
FIG. 12

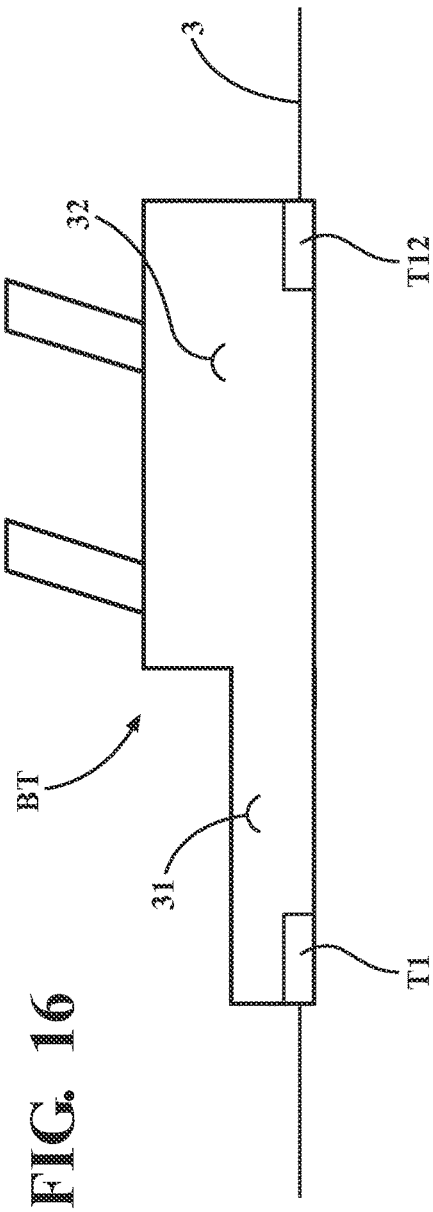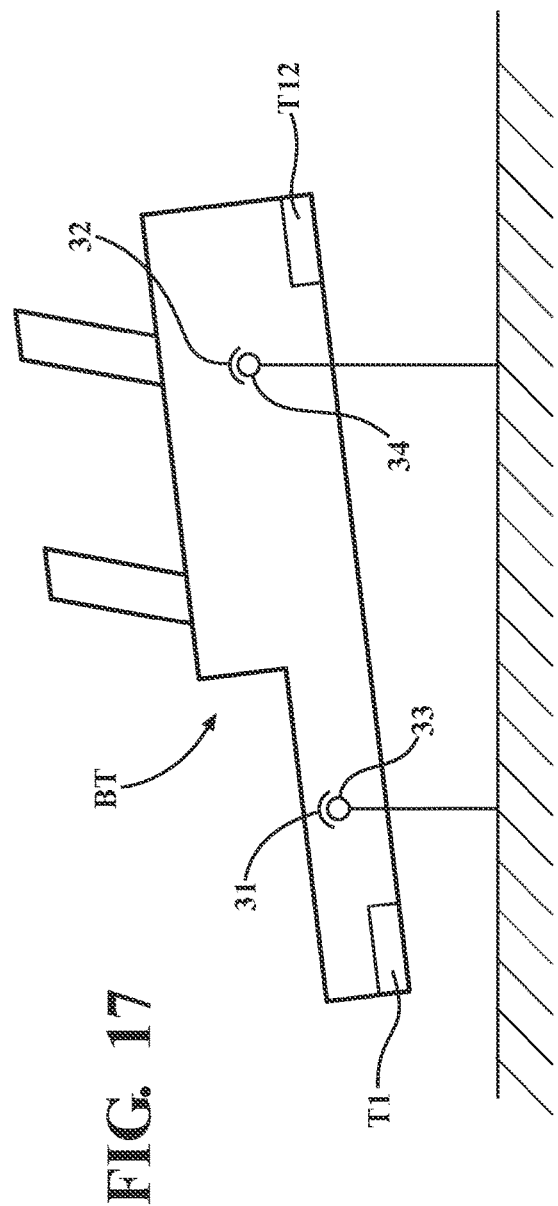

SHIP MODEL

CROSS-REFERENCE TO RELATED APPLICATION

This application is the U.S. national stage of PCT/EP2017/001110 filed Sep. 19, 2017, which claims priority of German patent application 10 2016 011 279.4 filed Sep. 20, 2016. The entire content of each application is incorporated herein by reference.

FIELD OF THE INVENTION

A ship model and a method for a controlled representation of a shipwreck that is as true-to-life as possible.

BACKGROUND OF THE INVENTION

Shipwrecks are a very moving subject for many people. The sinking of the Titanic in particular gave rise to a large number of films and publications in which this shipwreck was treated and in some cases simulated. In this process, miniaturized ship models or models of only partial regions of the ship were in particular used so that a realistic looking scenario was only able to be produced by the film imaging. A live viewing of the sinking of this model would have looked completely unrealistic in contrast.

The problem arises for a live viewing that on the sinking of the Titanic, the front region was very steeply underwater before the assumed breaking apart of the ship while the stern projected very steeply out of the water. With a ship length of approximately 280 meters, a depth of water of approximately 150 meters would have to be available to be able to realistically simulate this kind of shipwreck with a 1:1 model. This would make it considerably more difficult to have a controlled sinking and resurfacing of the ship model.

It is the underlying problem of the invention to also enable a live viewing of a shipwreck for a large number of people in a realistically appearing process.

SUMMARY OF THE INVENTION

The required depth of the water is substantially reduced by the invention. In a configuration, the hull is divided over its longitudinal extent into a plurality of segments that are movable with respect to one another and that are immersible below the water surface so that these segments can in particular be moved with respect to one another in the region underwater not visible to the public and can adopt a space-saving position only requiring a small depth of water.

The segments are in particular connected to one another in an articulated manner so that they can pivot with respect to one another and can thereby change their angular positions with respect to one another. For example, one segment can be approximately horizontal underwater while a segment connected thereto is set upright by some 10°.

In this respect, the hull is divided into at least two segments that are pivotable against one another to be able already to pivot a front part in a horizontal direction again during the sinking when the stern part is still in an upright position.

The hull is in particular divided into at least four segments so that the individual segments do not become too heavy and their relative movement with respect to one another is visually unremarkable and is simplified underwater.

If individual segments can be immersed below the surface of the water while others remain at least substantially above the water surface, a realistic sequence results in which parts of the ship are already underwater. The ship therefore does not have to be sunk uniformly as a whole. Only a small depth of water is nevertheless required due to the movability of the segments with respect to one another.

As in the actual sinking of the Titanic, the ship model can here also first be moved overall into a controlled, cohesive slanted position below the surface of the water, for instance such that the bow is already underwater and is no longer visible while the stern still projects up out of the water.

A segment at least almost completely disposed below the water surface can particularly be pivotable upwardly about its articulated connection there with respect to a segment disposed behind it and can thereby be moved into an at least almost horizontal position below the water surface. The depth of water required for this purpose is then considerably reduced and only requires the height of the hull plus the superstructures, optionally plus a funnel or mast. Since the movability of the segments with respect to one another is not recognizable above the water for the public, the realistic impression remains fully effective.

It is particularly impressive if individual segments are connected to one another via a multi-joint arrangement and if a setting upright of one or more segments, in particular disposed toward the stern, is possible into a projecting position tilted by more than 60° with respect to the water surface. The propellers and rudder blades can then, for example, project upward out of the water.

It is then equally possible that the segment or segments set upright is or are immersible below the surface of the water in their upwardly projecting position. This also corresponds to the actual sinking scenario of the Titanic in which the stern part was first set upright and then sank down in this upright position. A realistic simulation of the occurrence is then also possible in this respect.

To enable the relative movements of the segments, all the segments or at least individual ones of the segments can be provided with buoyancy tanks that can be variably filled and emptied. A positional change of this segment or of these segments can then thus be effected via the emptying or filling of said buoyancy tanks, for example a raising and thus an upward pivoting of one segment with respect to the other by blowing in air. Additionally or alternatively, the segment can also be led at the bottom of a tank, for example via slides or rods movable there.

As already indicated, the ship model can in particular be held in a tank, which has the advantage that a defined degree of cloudiness of the water can be set without too much algae growth being produced on the sunk ship model. Furthermore, with the tank solution, each segment or at least individual segments can be supported by the bottom of the tank, for instance in that they lie on the bottom of the tank, in their immersed positions. In addition, a defined swell can be set in the tank.

The tank can in particular have a depth of less than 40 meters with a length of the ship model of more than 200 meters and its dimensions can thus be kept moderate.

For a maximally realistic sequence presentation, the tank and/or the ship model can be adapted such that a segment of the ship model arranged in front of the segments that can be set to project upward can be held in a rearwardly increasing tilt position in its immersed position.

On an adaptation of the ship model, the segment arranged in front can have a keel line that projects downwardly with respect to the keel line of further segments for this purpose to thus come to lie tilted on the tank bottom, for example.

Additionally or alternatively, the tank bottom can have an upwardly facing tilted surface that is upwardly stepped in the manner of steps to support the immersed segment positioned in front.

A particular effectiveness of the sinking scenario can be achieved if the ship model is overarched by a hall-like cover and if different visual scenarios can be projected onto said cover, for example a night sky that corresponds to the real conditions on the sinking of the Titanic, for example. A daytime scenario can also be set.

For this purpose, the ship model is in particular configured in the manner of a passenger ship in a simulation—at least of the outer installations—that is as realistic as possible.

The effect is all the more impressive, the closer the model is to the original in its dimensions. A scale of 1:2 up to ideally 1:1 is therefore desirable. The model can in every case be walked on, with the passengers possibly also being able to remain on board on a beginning tilted position. The evacuation can also take place more or less realistically via lifeboats or also via gangway accesses.

A method for a controlled simulation of a shipwreck is separately claimed in which a ship model is sunk below the water surface and in which the ship model is initially moved into a position that is tilted overall and thereby presses a part of the ship model below the water surface, with a first segment being moved into an upwardly pivoting position opening into an at least almost horizontal position with respect to the next segment after the complete immersion of said first segment below the surface of the water. This relative movement in particular does not only apply to the first segment, but also to further segments with larger ships. After a complete immersion below the surface of the water of a segment directly following an already immersed segment, it is moved into a position pivoting upward with respect to its segment adjoining toward the stern and opening into a horizontal position so that the segments can again gradually adopt their horizontal positions aligned behind one another underwater despite a slanted sinking. This composition underwater is, however, not compulsory.

BRIEF DESCRIPTION OF THE DRAWINGS

Further advantages and features of the invention result from embodiments of the subject matter of the invention shown in the drawing and described in the following.

FIG. 12 is a view of the tank for holding the ship model in a view from the front with closed slider (left) and a closed slider (right);

FIG. 16 is the part of the ship model shown in FIG. 15 with additionally drawn buoyancy bodies and support points beneath which buoyancy bodies held at the bottom under the water surface can engage;

FIG. 17 is the part of the ship model shown in FIG. 15 in a sunk floating position beneath the water surface;

DETAILED DESCRIPTION OF THE INVENTION

Figure 1:
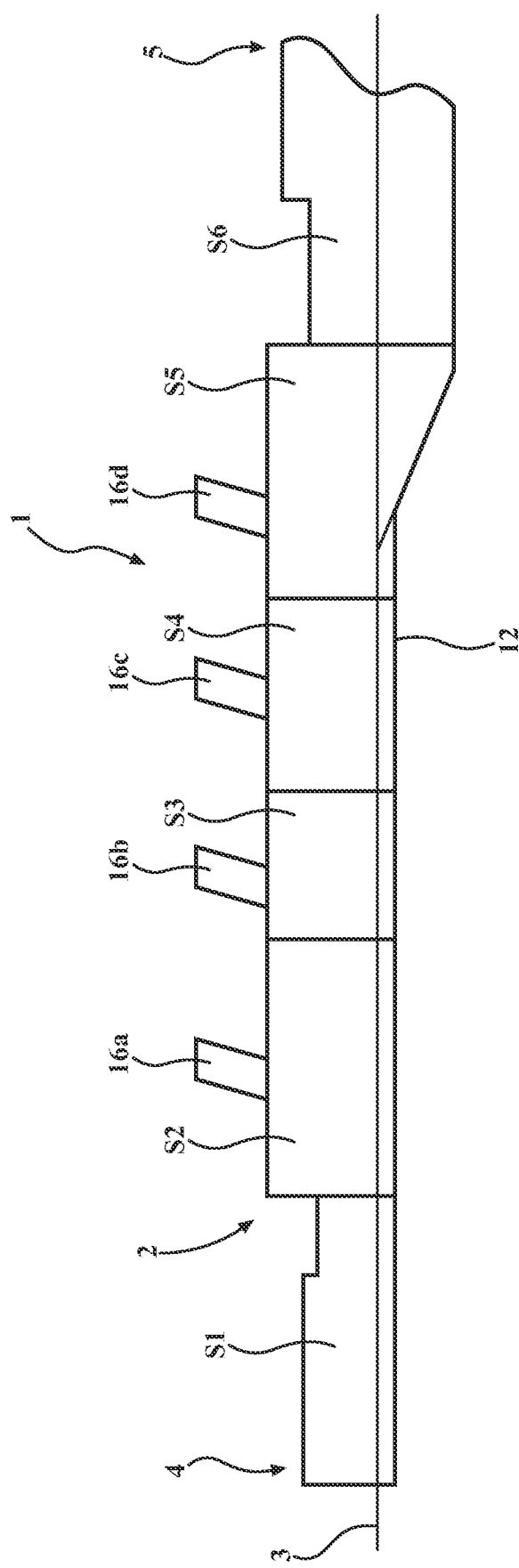
FIG. 1 is a ship model composed of a plurality of segments following one another in a schematic side view in a completely floating position.

The ship model 1 shown in FIG. 1 shows an elongated hull 2 that can in particular be walked on by a large number of people and can therefore be built close to the original with respect to the outer appearance and to materials. For example, the ship model 1 can be produced substantially from steel or wood, the decks can at least be partially covered by wood. The ship model 1 is likewise preferably kept close to the original for its ability to be walked on and for the authentic impression. A scale between 1:2 and 1:1 can in particular be considered.

The ship model 1 is in particular configured in the manner of a passenger ship—here the Titanic—but cargo ships or warships can also be considered.

The hull 2 does not require its own drive or its own possibility to generate electrical energy. This can be coupled in from the outside. An internal equipping of the hull 2 can also be substantially superfluous. It can thus be sufficient to have a bridge that can be walked on and/or a large dining room and/or decks having lifeboats, while the hull 2 otherwise substantially forms a torso, that is a shell that substantially comprises hollow spaces outside its bearing structures.

Figure 10:
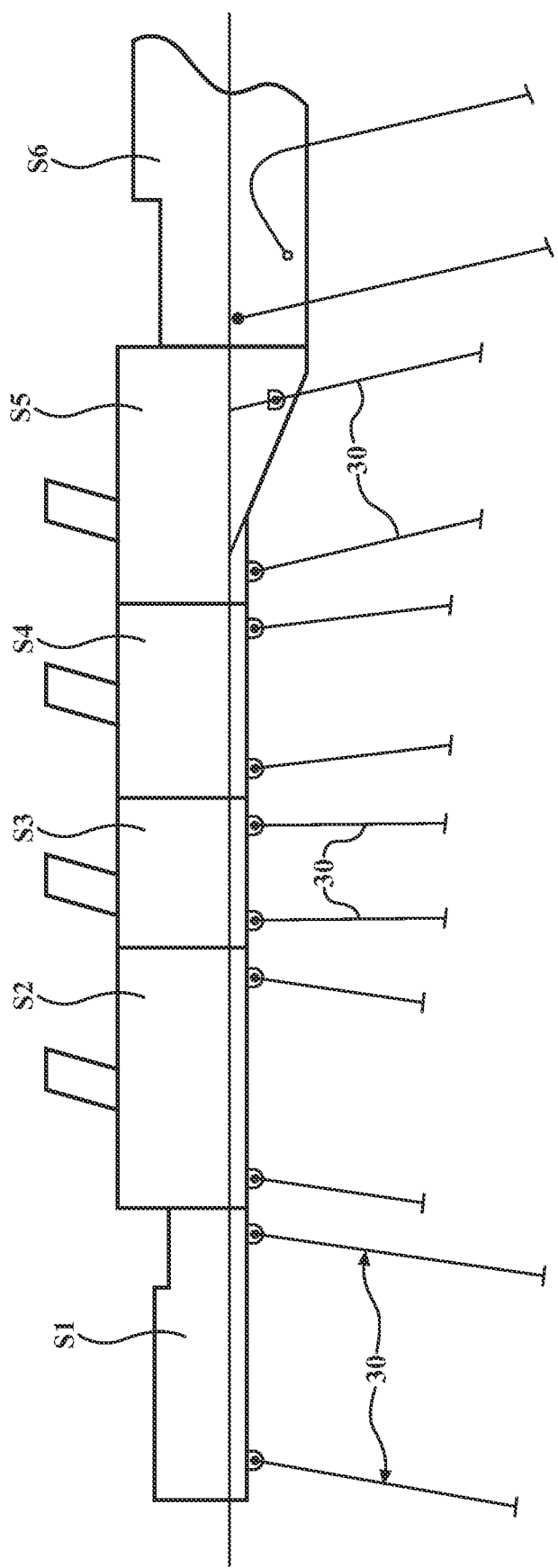
FIG. 10 is an alternative ship model in a position as in FIG. 1, but with segments held movably in the region of a tank bottom via connectors that can be moved by a motor and are in particular pivotable.
Figure 11:
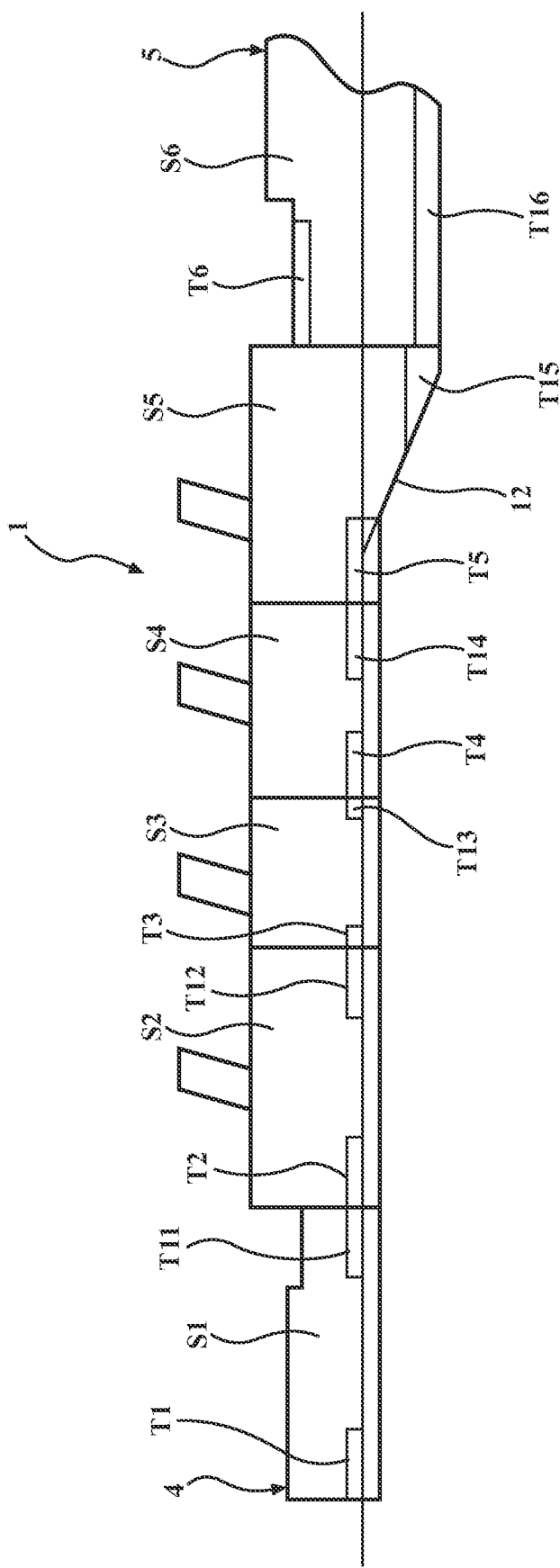
FIG. 11 is a similar view of the ship model to FIG. 1, with additional buoyancy tanks being drawn in the individual segments.
Figure 13:
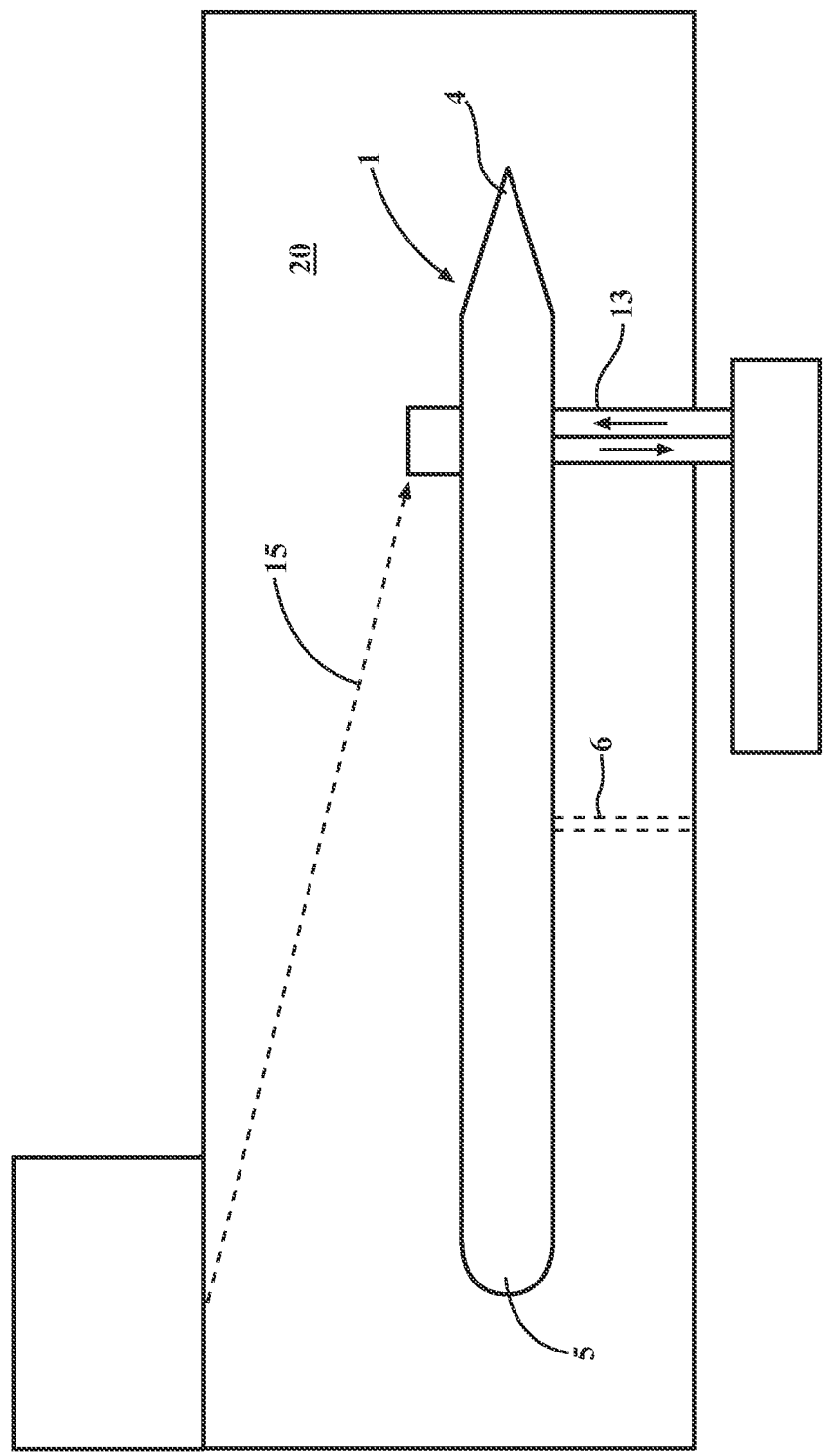
FIG. 13 is a view from above of the ship model held in the tank with a gangway and a passageway that simulates an inner space for the embarking and disembarking of the passengers.

Depending on the design, the hull 2 can itself be able to float, or as indicated in FIG. 10, can be held overall via connectors 30 movable via a motor such that it then does not necessarily require a floating capability of its own. With an existing floating capability, individually controllable pull ropes can be provided instead of the connectors 30 to pull the respective segments S1, S2, S3, S4, S5, S6 downwardly and to align them suitably in their respective angular positions.

The hull 2 is in every case divided over its longitudinal extent L into a plurality of segments S1, S2, S3, S4, S5, S6 that can be moved with respect to one another and that are immersible under a water surface 3. The number of segments S1, S2, S3, S4, S5, S6 can be different; here at least two segments, in particular at least four segments, are provided that are movable with respect to one another. The separation grooves between the segments are visually not recognizable from the outside, where possible. The segments can each be several 10 meters long, for example approximately 30 to 50 meters here, since they substantially only form steel boxes.

In accordance with the drawn embodiment, six segments S1, S2, S3, S4, S5, S6 are provided over the longitudinal extent L to be able to simulate a sequence of the sinking of the Titanic that is as realistic as possible with a breaking apart of the ship in the middle region and with a steep rising of the stern region.

The segments S1, S2, S3, S4, S5, S6 are here connected to one another in an articulated manner, with in detail in dependence on a desired movement sequence, joints having one degree of freedom being able to be sufficient or with multi-joint arrangements having a plurality of degrees of freedom of movement being required. This is performed in detail further below. Segments S1, S2 and/or S3 can also be combined to one segment, for example. The division of one segment into a plurality of subsegments is also possible (example S6).

Segments S1, S2, S3, S4, S5, S6 can each have floodable tanks or buoyancy bodies T1, T11, T2, T12, T3, T13, T4, T14, T5, T15, T6, T16 via whose controlled filling with water or venting the relative position of the respective segment and its floating above or sinking below the water surface 3 can be set.

With a corresponding partial flooding, in particular of the tanks T1, T11, T2, T12 of the front segments S1, S1 of the hull 2 being moved as a whole into a controlled and contiguous slanted position disposed partially below the water surface 3 in which the bow 4, for example, is already below the water surface 3 and the stern 4 projects upwardly far above it. A rotatability of the stern 4 about a longitudinal axis is also possible.

It is possible that people are still on board the ship model 1 at the start of this starting tilting in order thus to experience and feel the sinking directly before a complete evacuation takes place, either via a gangway 6 leading to land or via lifeboats.

In addition to the total sinking of the connected segments, it is also possible that individual segments (for example S1 to S3) are immersible below the water surface 3 while others (for example S4 to S6) remain in a floating position on the water surface 3.

The funnels 16a, 16b, 16c, 16d can be able to be pushed or pivoted inward with respect to the segments S2, S3, S4, S5 respectively holding them to be able to reduce the height of the respective segments during the sinking for a water depth that is as small as possible. The breaking off of funnels also corresponds to the sequence of the original sinking of the Titanic. The same also applies to a movability of masts that can likewise be based on the original sinking.

Figure 2:
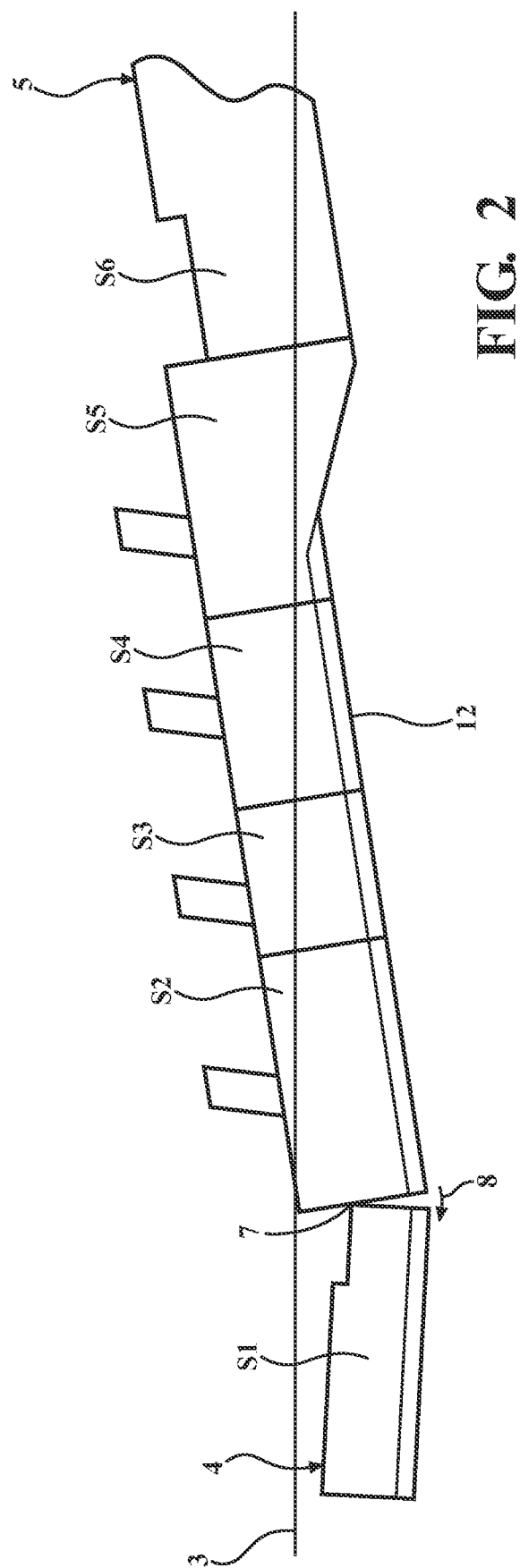
FIG. 2 is a similar view to FIG. 1, but with a tilted location of the ship model sinking by the bow, with a 1st segment, viewed from the bow, being upwardly pivoted into a substantially horizontal position with respect to a following 2nd segment.

In this respect, a segment (for example S1) disposed at least almost completely below the water surface 3 in the respective immersion state can pivot upward there in the direction of the arrow 8 about its articulated connection, namely a pivot hinge 7 having at least one degree of freedom, with respect to a segment disposed behind it (for example S2) and can thereby move into a flatter, in particular at least almost horizontal position below the water surface 3, as drawn in FIG. 2. The segment S1 thereby requires a substantially smaller depth of water. The same applies to the joint 9 between the segments S2 and S3 in FIG. 3 that represents a later time in the sinking process.

Figure 3:
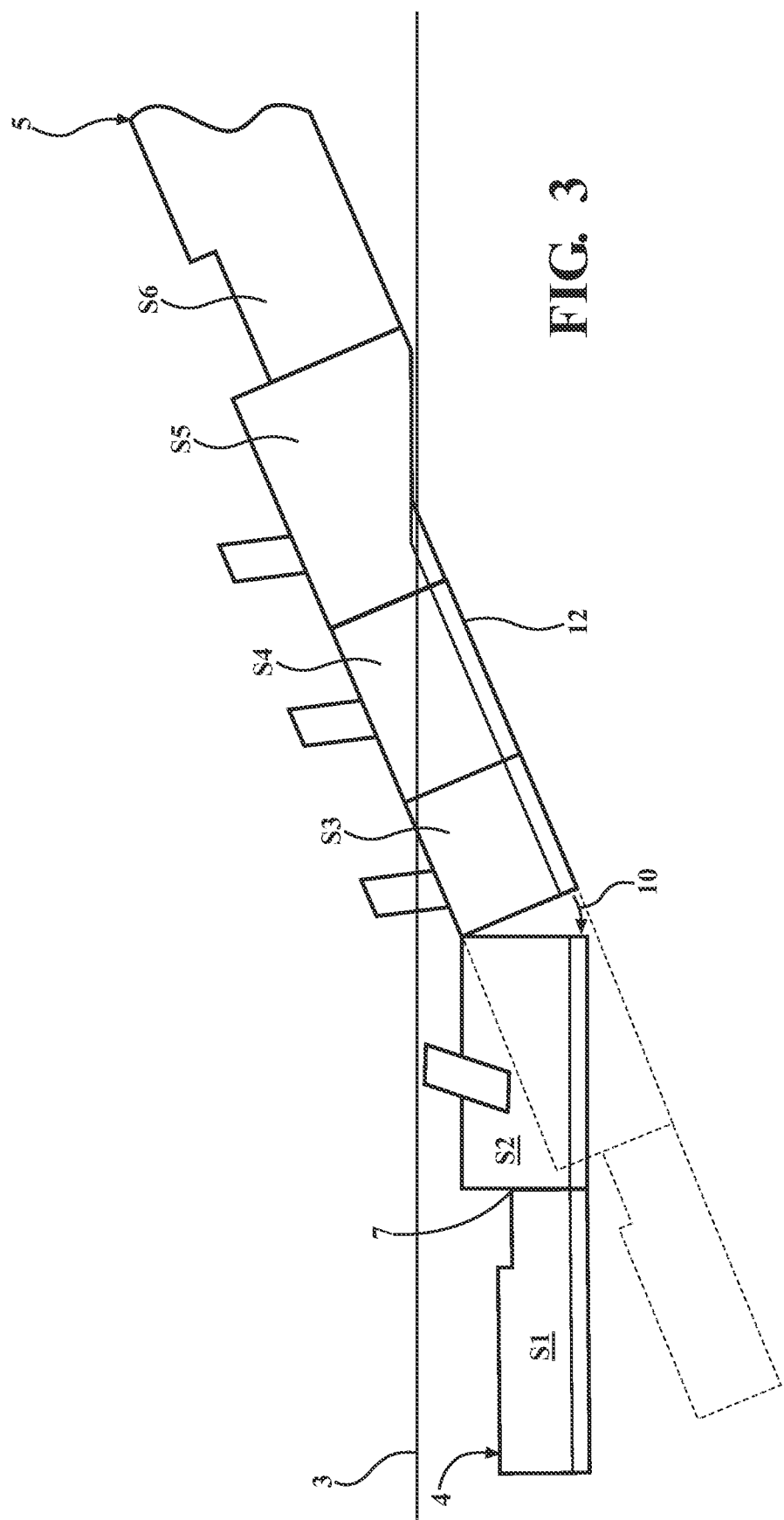
FIG. 3 is a similar view to FIG. 2 on a further sinking of the ship, with the 1st and 2nd segments together being upwardly pivoted into a horizontal position with respect to the 3rd segment and the non-pivoted position of these segments being drawn as dashed for comparison.

In this process, the segments S1 and S2 move into the position shown in FIG. 3 that is pivoted in the direction 10 and that is thus raised and almost horizontal instead of—as shown dashed—submerging downwardly in a straight line, which would require a substantially greater depth of water.

Instead of the simple pivot joints 7, 9, individual segments (for example S5 and S6) can also be connected to one another via a multi-joint arrangement 11. A setting upright of one or more segments (for example of segment S6), in particular disposed toward the stern into a projecting position tilted by more than 60° with respect to the water surface 3 is possible via this. A position tilted by approximately 90° with respect to the water surface 3 is thus also possible, as is shown in the drawing here. It is not only possible here that one or more segments (here the segment S6) are set up in the described manner, but also that the segment(s) set upright can be lowered below the water surface 3 in their projecting position.

As can, for example, be recognized in FIG. 10, either each segment S1, S2, S3, S4, S5, S6, as shown here, or at least individual segments can be provided with buoyancy tanks T1, T11, T2, T12, T3, T13, T4, T14, T5, T15, T6, T16 that can be variably filled and emptied. Positional changes of this segment or these segments can be effected via their emptying or filling. Since at least two buoyancy tanks are provided per segment, e.g. T1, T11 in segment S1, possibly also more, it is not only possible to control whether the segment floats as a whole or is lowered below the water surface by them, but the relative position of this segment can additionally also be influenced. A separate buoyancy tank or no separate buoyancy tank at all can also be provided in some segments (not drawn here). Since a tank T16 is held at the upper end below the deck line in segment S6, for example, the vertically upright position of this segment during its sinking can be set and maintained by its filling. A flooding of the tank T6 with air in contrast provides the required buoyancy to initiate the raising of the segment S6 above the water surface 3.

If the ship model 1 is held in a closed tank 20, a plurality of advantages result: on the one hand, the stream of visitors can be channeled and secured—unlike on the open sea; on the other hand, the composition and cloudiness of the water can be adapted such that, on the one hand, sunk segments quickly become invisible, but, on the other hand, are not covered by algae on a frequent sinking and reemerging; finally in particular a support of all the segments or of individual segments S1, S2, S3, S4, S5, S6 is also possible in the sunk state at the tank bottom 21. A constant swell can also be set in the tank 20.

The tank 20 can for this purpose have a depth under the water surface 3 of less than 40 meters with a length of the ship model 1 of more than 200 meters. In addition, the tank 20 can also have such a shape that it only has such a depth in the transverse center region 22 in which the ship model 1 sinks and is considerably shallower to the side thereof to keep the required water volume small. Access to the deep region 22 can additionally be closable by a locking slide 23 or similar.

In addition, at least one segment S5 arranged in front of the segments that can be set upright, here the rearward segment S6, can be holdable in its sunk position in a position rising obliquely to the rear. To make this position possible, on the one hand, the keel line 12—not visible—of the segment S5 arranged in front here is formed as projecting downwardly with respect to the keel line of further segments S1, S2, S3, S4. On the other hand, the tank bottom 21 has an upwardly facing slanted surface 24 which is offset in a step-like manner upwardly and on which the keel line 12 of the segment S5 can be placed to support this lowered segment S5 arranged in front. It is understood that such structures relate to different segments and can be formed in different geometries depending on the division of the ship model 1 and on the manner of the sinking.

The keel line 12 becomes visible above the water surface in the region of the stern segment S6 due to the rising up and the underwater ship is therefore designed realistically here with shafts, propellers, and rudder blades (not drawn).

The tank 20 can furthermore be arched over by a hall-like cover 25, in particular as part of a closed hall. This cover 25 can, for instance, have a curvature having a large radius on whose inner side a different visual scenes can be projected, for example a starlit sky and/or a rising iceberg. An iceberg can likewise be provided as a realistic and optionally moving model in the tank 20 and can also carry out a real collision with the hull 2 that can be felt by visitors present on board.

In addition, compressed air can be introduced into the water of the tank 20 during the sinking, for instance via hoses beneath the water surface 3, to thus replicate the seething of the ocean and the air exit from the ship.

It is furthermore also possible that a region provided with internal fittings is provided within a segment and is pulled out of the hull 2 and hidden at a side remote from the visitors prior to the sinking before the ship model 1 sinks. A large area of air that would generate correspondingly great buoyancy and would impede the sinking would thus be removed in good time.

Additionally or alternatively, a gangway 13 configured in the inner space of the ship can be accessible, for example, from the hull 2 via spiral staircases. These spiral staircases can, for instance, be configured such that visitors do not notice the entrance to the gangway and believe they are still on the ship. This gangway can then lead into an inner space 14 that is faithfully furnished and that is itself not an element of the hull 2 and likewise does not sink with it. Such a scenario can, for instance, be recognized in a plan view. It can additionally be seen there, for example, that the visitors on the side remote from the gangway 13 are, for example, transferred by boat on the line 15.

Alternatively a quay wall can be provided that is lowered or displaced after boarding the ship and is then removed from the field of view.

To simulate the sequence corresponding to the actual course of the sinking in a faithful manner, the ship model 1 is first moved into an overall slanted position thereby pressing a front part of the ship model 1 below the water surface by at least partly flooding the first and second segments S1, S2 from the bow 4. After a complete immersion of the first segment S1 below the water surface 3, a one or more buoyancy tanks T1, T2 is brought by blowing in air into a position pivoting upward via the joint 7 in the direction 8 and opening into a horizontal position with respect to the next segment S2, as can be seen in FIG. 2.

This process is continued after immersion of a further segment 2: it is brought, after a complete immersion below the water surface 3, into a position pivoting via the joint 9 in the direction 10 and opening into the horizontal position with respect to it segment S3 adjoining stern-wards. The joint 7 between the segments S1 and S2 simultaneously closes here so that they are then disposed approximately in alignment and more or less horizontally behind one another below the water surface 3.

Depending on the number of segments, this process can continue a long way to the rear via a plurality of segments.

Here, however, the connection of the segment S3 and the segment S4 following toward the stern is different to be able to replicate a breaking apart of the ship approximately in the middle—as in the real sinking of the Titanic.

Figure 4:
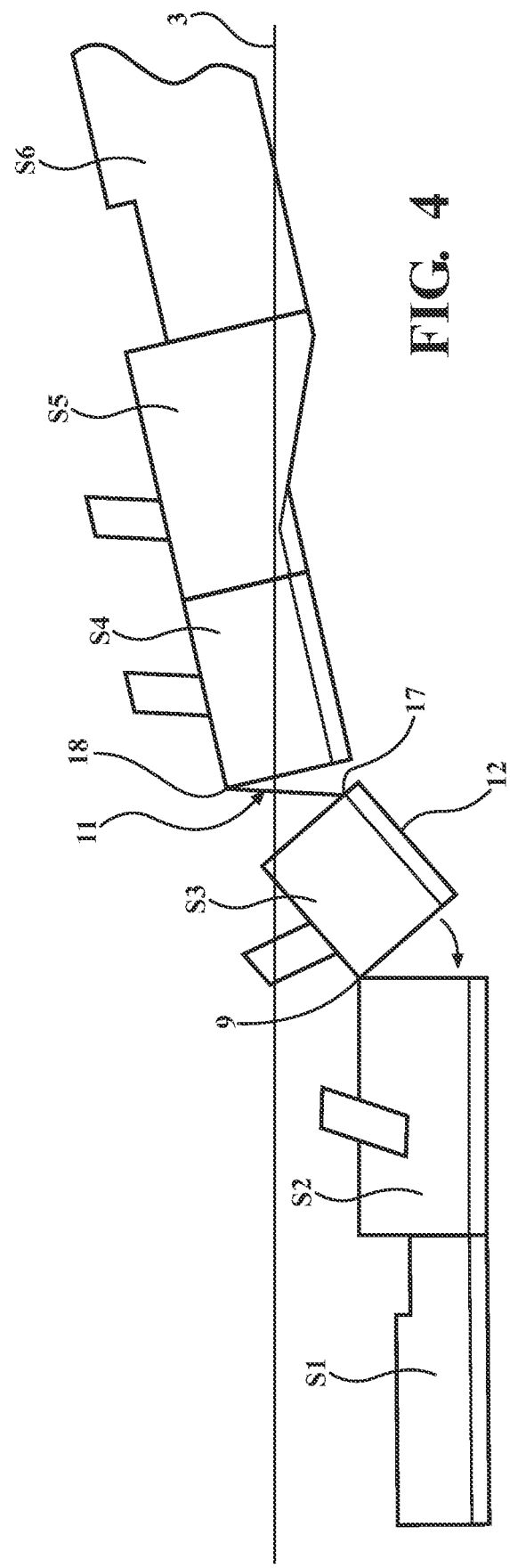
FIG. 4 is a similar view to FIG. 3, but with a 3rd segment being downwardly pivoted with respect to the segment following toward the stern to simulate a breaking apart of the hull.

The segment S3 here initially opens with respect to the segment S4 adjoining toward the stern above the water line 3 around the lower joint 17 so that a crack opens between these segments S3 and S4 in the visible region (FIG. 4). At the same time, the stern region composed of the segments S4 to S6 is raised above the water surface 3, for instance by an introduction of compressed air into the buoyancy tanks T15 and T16.

Figure 5:
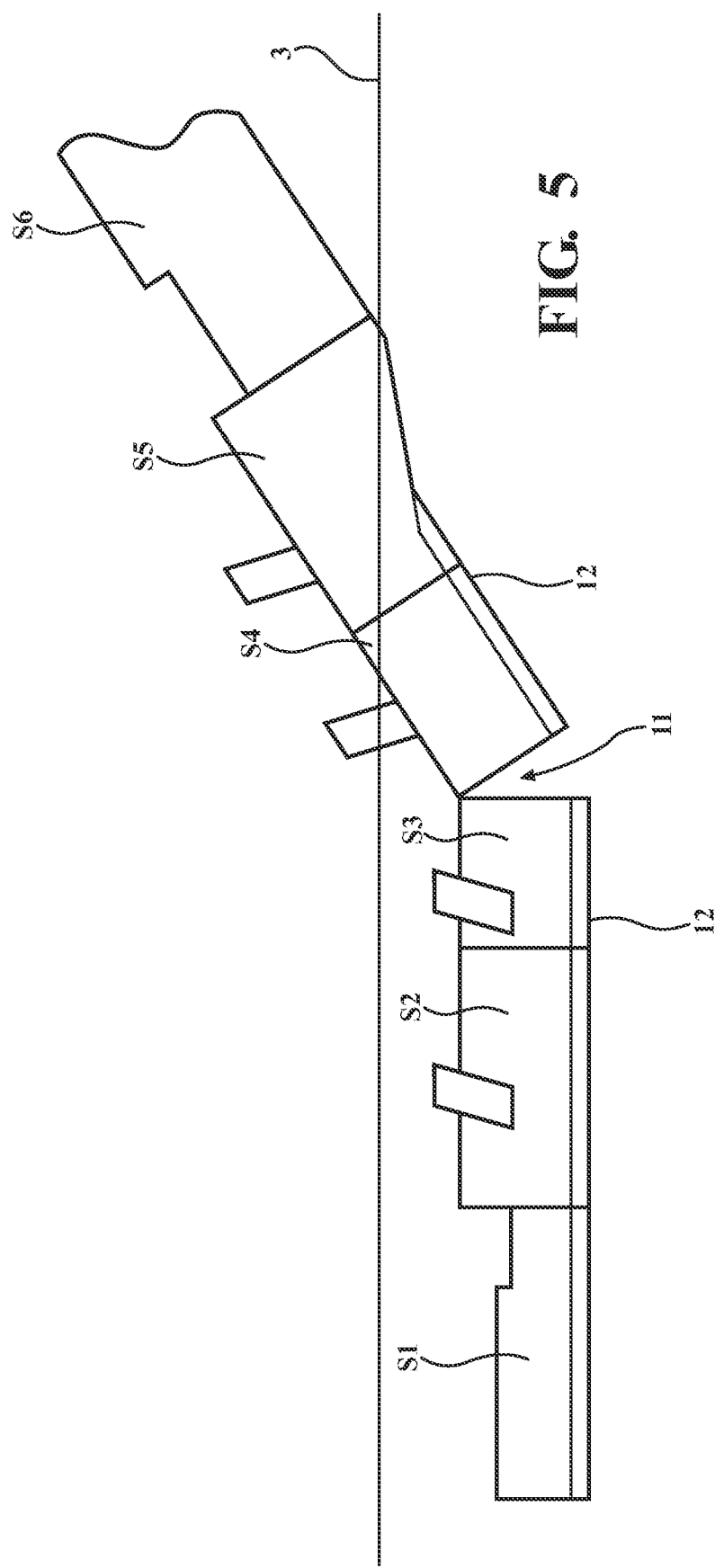
FIG. 5 is a similar view to FIG. 4, with a 3rd segment pivoted toward the front segments underwater and with a beginning setting upright of the segments toward the stern.
Figure 6:
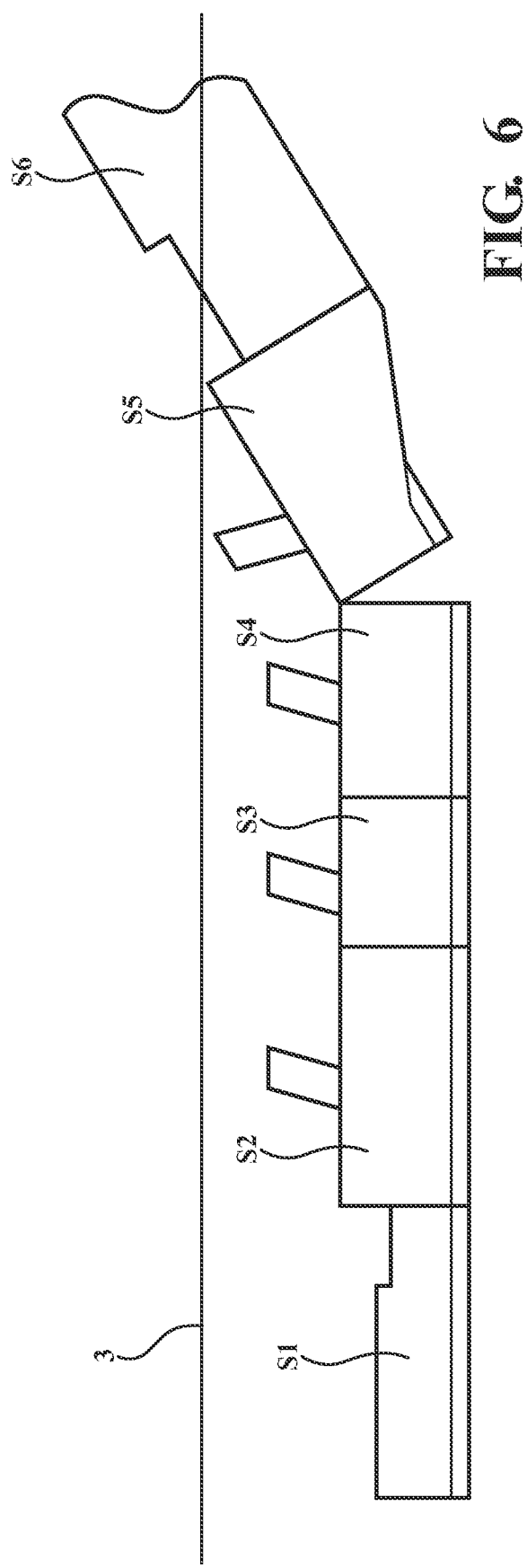
FIG. 6 is a similar view to FIG. 5 after the 4th and 5th segments are disposed completely underwater and the 5th segments is still aligned with the stern segment.
Figure 7:
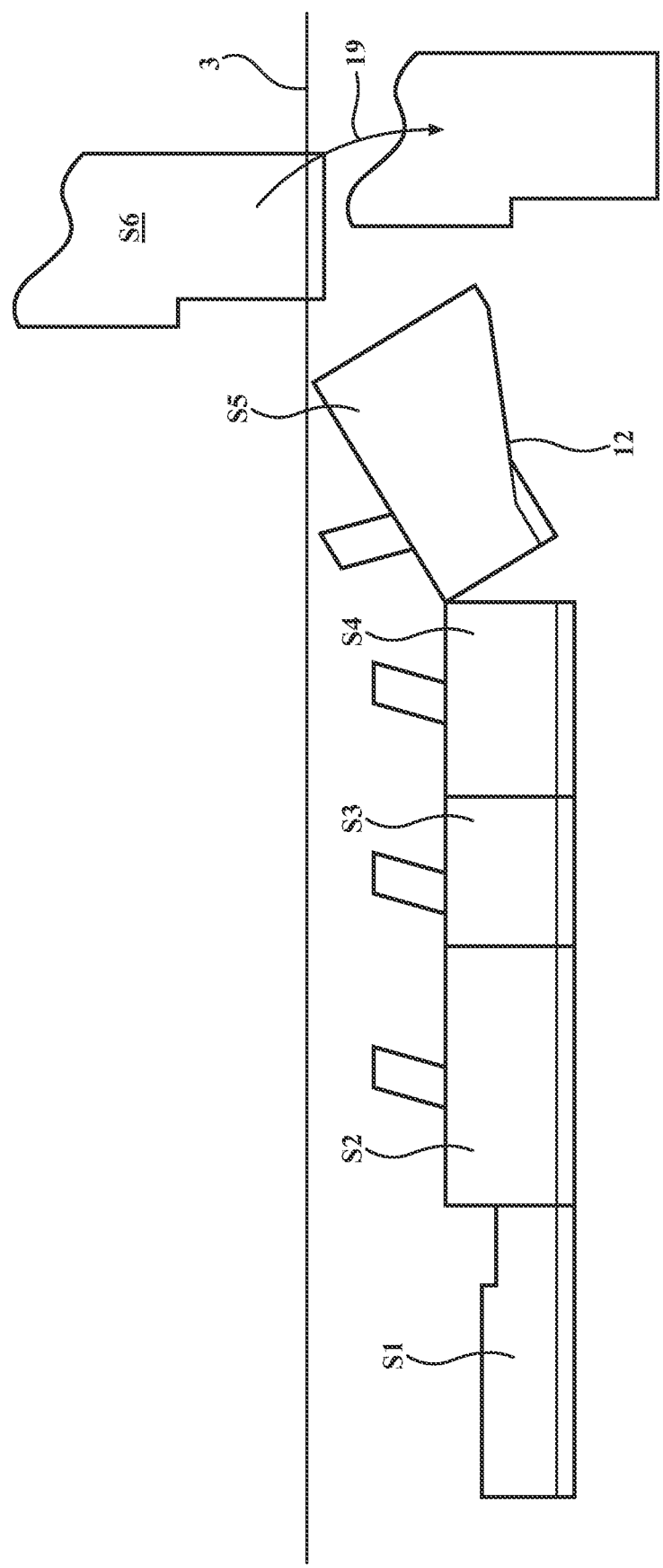
FIG. 7 is a similar view to FIG. 6 with an unchanged position of the fifth segment and a steep setting upright and subsequent steep falling of the 6th segment.
Figure 8:
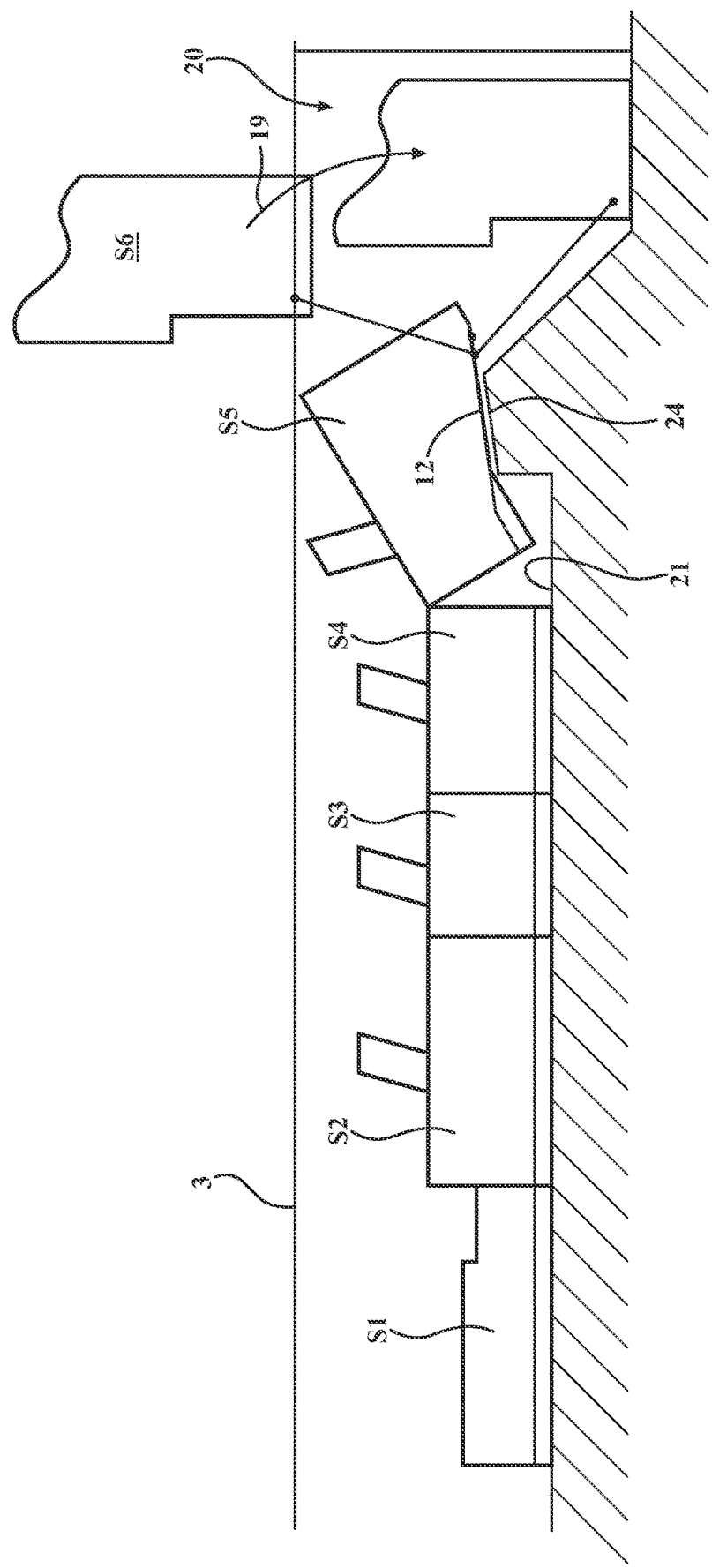
FIG. 8 is a similar view to FIG. 7 with an additional drawn tank in which the ship model is received.
Figure 9:
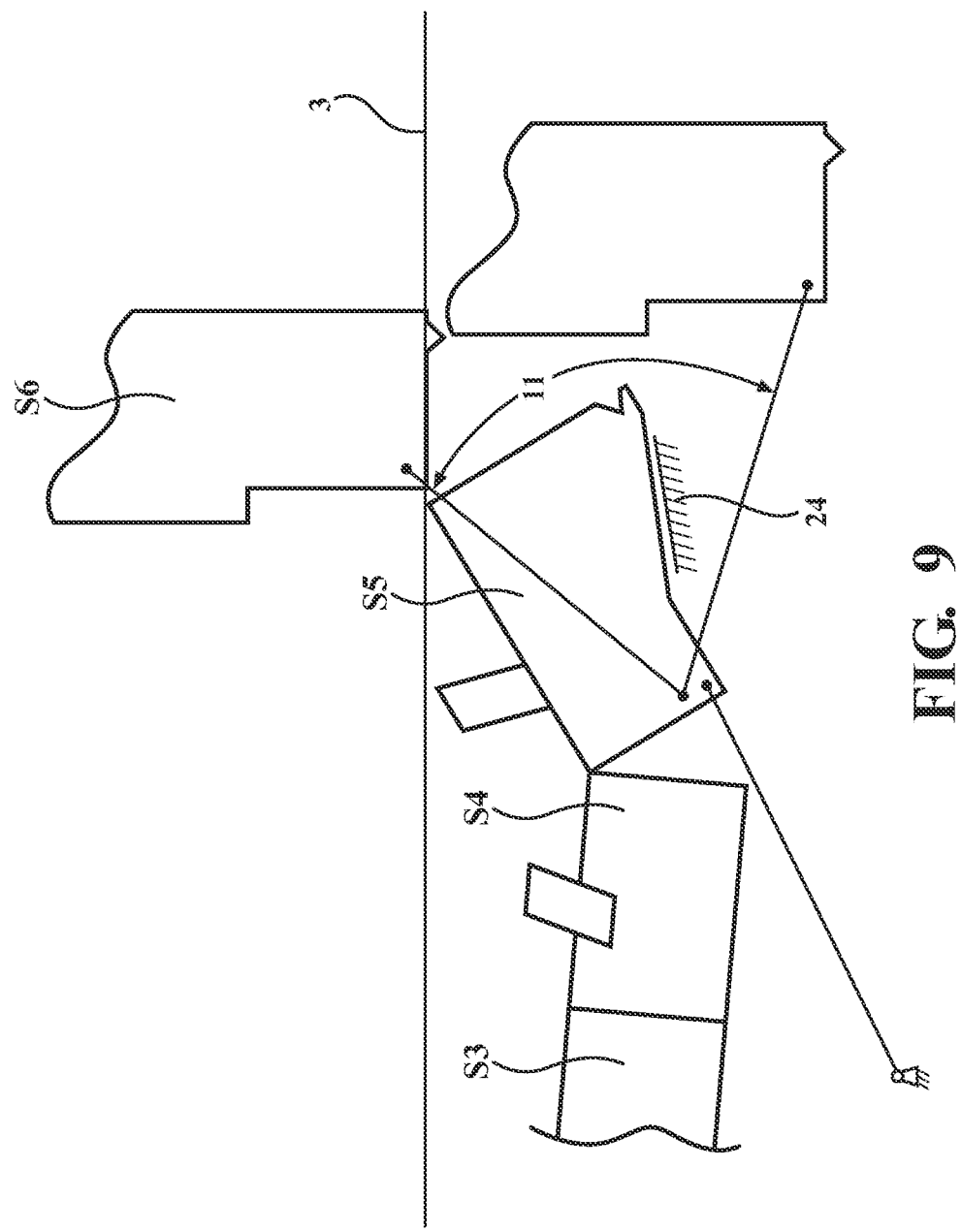
FIG. 9 is a detail view of the segments 4, 5, and 6 toward the stern in the positions in accordance with FIG. 7.

After the sinking of the segment S3 third from the front, it can open toward the segment S4 following toward the stern about an upper joint 18 and can adjoin the front segments S1 and S2 in an aligned manner (FIG. 5). In the transition from the fourth segment S4 to the fifth segment S5, the relationships are as between the first two segments S1 and S2 so that after the sinking of the fourth segment S4, it is then positioned horizontally and in alignment behind the other segments S1 to S3.

During its sinking, the fifth segment S5 here is seated on a slanted surface 24 of the tank bottom 21 due to the special shape of its keel line and is thereby immovably held in its position. The multi-joint arrangement 11 opens with respect to the stern part, that is the sixth segment S6, during this process so that said sixth segment S6 can move into the vertical position corresponding to the real sinking or inclined by at least more than 60° with respect to the water surface 3 on the introduction of air into the buoyancy tanks T6 and T16 and can also be lowered underwater in this alignment in the sinking direction 19 so that a particularly dramatic and simultaneously realistic sequence results.

This type of sinking does not have to be limited to the one segment S6, but can also relate to a plurality of upright segments behind one another.

Figure 14:
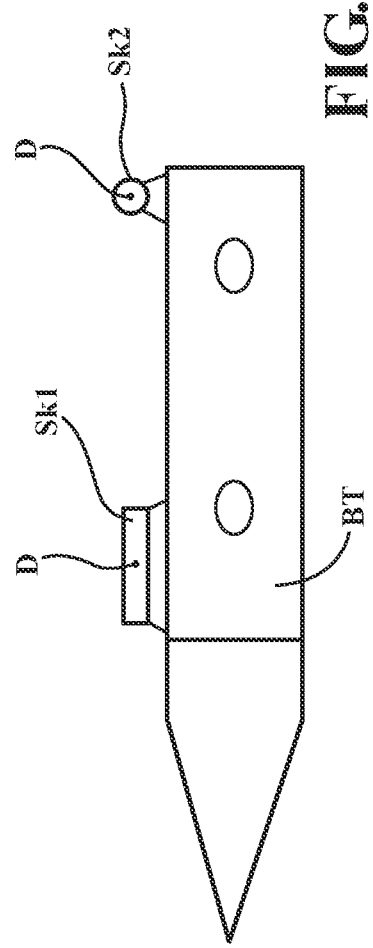
FIG. 14 is a plan view of a front part of the ship model that is here laterally guided via posts ending below the surface of the water and arranged laterally next to the ship model, with the front post engaging into an elongate hole as a "floating bearing" to thus be able to compensate a tilted position of the shown part.
Figure 15:
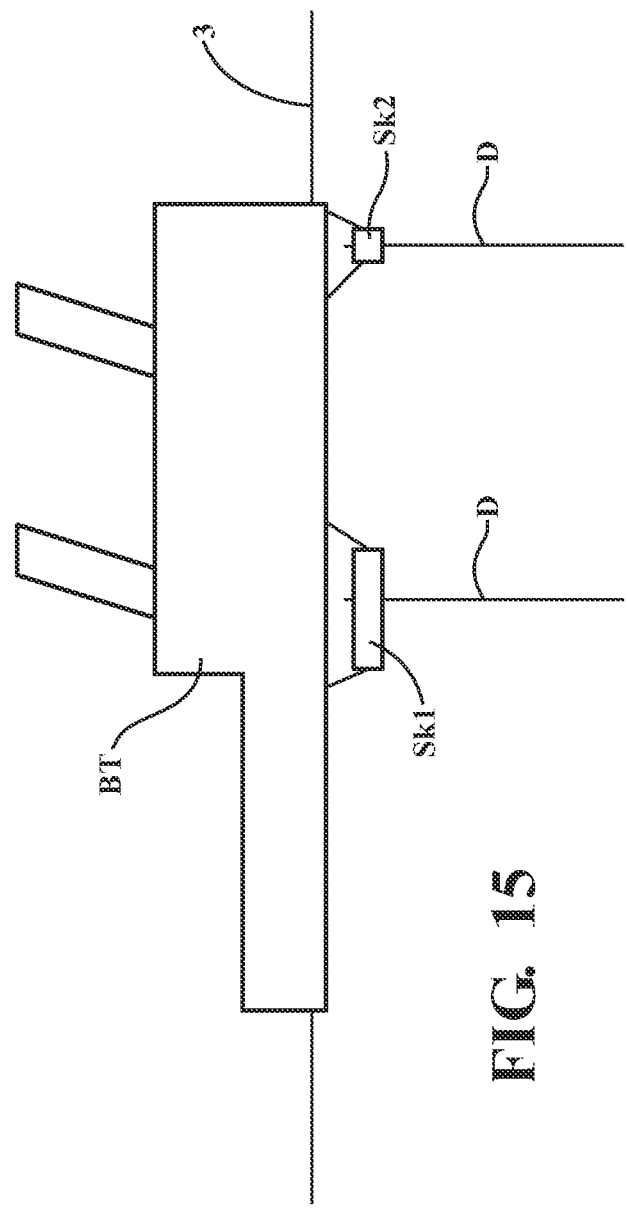
FIG. 15 is the part of the ship model shown in FIG. 14 in a side view.

It is also drawn in FIGS. 14 and 15 that a part of the ship model 1, for example a bow part BT here, is also laterally guided at dolphins D or at other fastenings held on the bottom. The dolphins D or other fastenings end invisibly below the water surface 3. The rear dolphin D here is closely surrounded by a float SK2 that prevents a horizontal movement of the bow part BT; in contrast, the front float SK1 forms an elongate hole so that a horizontal displacement toward the dolphin D is possible there and thus also a slanted sinking of this bow part BT despite the holding upright of the lateral transverse guide. It is understood that such support holders are also possible for other ship parts and in different modifications.

The version of a bow part BT in accordance with FIGS. 16 and 17 shows that a sunk part of the ship model 1, here the bow part BT, also does not have to be lowered to the bottom, but can also be in a suspended state in a sunk position in which it is completely invisible below the water surface. For this purpose the ship model 1 comprises support points 31, 32 in the bow part BT shown by way of example that are seated on buoyancy bodies 33, 34 on the sinking of the bow part BT that are in turn held firmly on the bottom by chains, wire ropes, dolphins or similar. The buoyancy tanks T1, T12 are here only filled so much with water that a slow sinking results and the further sinking ends and a state of equilibrium of the suspension is adopted on the setting down of the ship body BT that is, for example, laterally guided as in FIGS. 14 and 15. The bottom then does not have to have a special design, but can rather maintain a natural design, for example. Additional buoyancy bodies can also be located in the respective ship part so that the above-described suspended state is also adopted with completely filled buoyancy tanks T1, T12.

Figure 19:
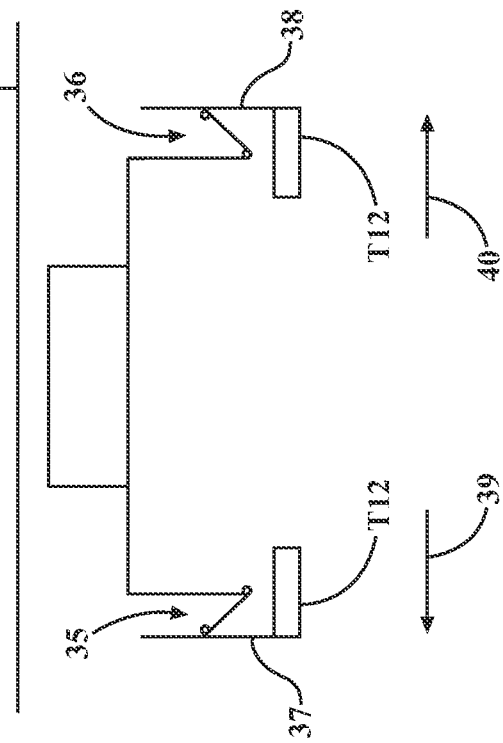
FIG. 19 is a view from the front of the sunk part of the ship model of FIG. 18, with the height of the hull being reduced by a migration of lower parts of the hull transversely to the outside with a simultaneous upward movement with respect to the upper part of the hull.
Figure 18:
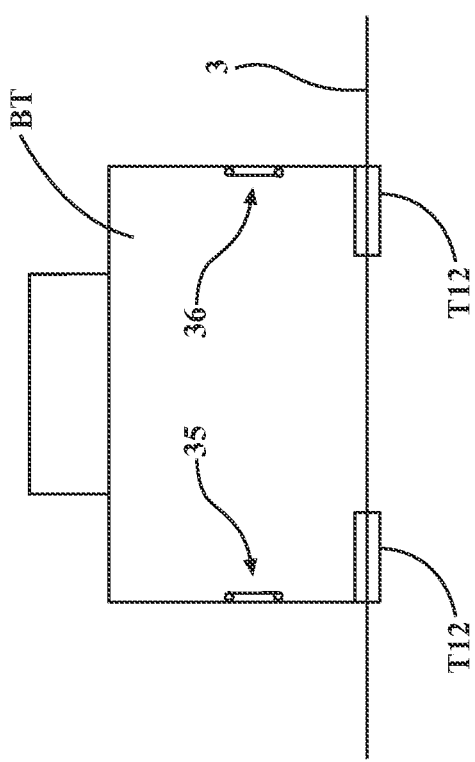
FIG. 18 is a view from the front or from the rear of a floating part of the ship model.

A view from the front or from the rear of a floating part of the ship model, for example the bow part BT, is shown in FIGS. 18 and 19, with additional joints or similar division possibilities 35, 36 being provided via whose kinking the height of the ship body on the sinking can be reduced. The height is reduced here at the cost of the increasing width due to a migration of lower parts 37, 38 of the hull transversely outwardly in the direction of the arrows 39, 40 with a simultaneous relative upward movement with respect to the upper part of the hull. The ship part BT thereby becomes flatter overall so that the depth of the water can be further reduced, which further reduces the construction demands to implement the invention. It is understood that different folds (for example transversely inwardly) or pivoting movements (for example transversely inwardly or transversely outwardly in a horizontal direction) of the lower parts 37, 38 of the hull are possible to reduce the height. The different ship segments can here each have different divisions and/or pivoting directions.

Above, the invention is described with reference to some embodiments. However, it is realized that other embodiments may be provided without departing from the scope of the invention as defined in the accompanying claims.

| Reference numeral list: | |
|---|---|
| 1 | ship model |
| 2 | hull |
| 3 | water surface |
| 4 | bow |
| 5 | stern |
| 6 | gangway |
| 7 | joint |
| 8 | pivot direction |
| 9 | joint |
| 10 | pivot direction |
| 11 | multi-joint |
| 12 | keel line |
| 13 | passageway |
| 14 | inner space |
| 15 | boat's line of travel |
| 16a-16d | funnels |
| 17 | lower joint |
| 18 | upper joint |
| 19 | sinking direction |
| 20 | tank |
| 21 | tank bottom |
| 22 | deep region |
| 23 | locking slider |
| 24 | slanted surface |
| 25 | hall-like cover |
| 30 | connector |
| L | longitudinal extent |
| S1 | first segment |
| S2 | second segment |
| S3 | third segment |
| S4 | fourth segment |
| S5 | fifth segment, |
| S6 | sixth segment |
| T1, T11 | buoyancy tanks |
| T2, T12 | buoyancy tanks |
| T3, T13 | buoyancy tanks, |
| T4, T14 | buoyancy tanks |
| T5, T15 | buoyancy tanks |
| T6, T16 | buoyancy tanks |
| BT | bow part |
| D | dolphins |
| SK1 | floats |
| SK2 | floats |
| 31 | support parts |
| 32 | support parts |
| 33 | buoyancy bodies |
| 34 | buoyancy bodies |
| 35 | joint |
| 36 | joint |
| 37 | lower hull part |
| 38 | lower hull part |
| 39 | direction |
| 40 | direction |

The invention claimed is:

1. A ship model, comprising:
an elongated hull divided into a plurality of segments including a bow segment, a stern segment, and at least one mid-segment between the bow and stern segments;
the plurality of segments being movable with respect to one another and being immersible under a water surface;
wherein each of the bow and at least one mid-segment is configured to be lowered below the water surface while at least a remaining one of the plurality of segments remains in a floating position on the water surface.

2. The ship model of claim 1, wherein the plurality of segments are connected to one another in an articulated manner.

3. The ship model of claim 2, further comprising an articulated connection that pivotably connects one of the plurality of segments with another of the plurality of segements, wherein the one of the plurality of segments is almost completely below the water surface and is movable into an almost horizontal position below the water surface.

4. The ship model of claim 2, further comprising a multi-joint arrangement to connect two or more of the plurality of segments with each other, wherein the multi-joint arrangement and the two or more of the plurality of segments are configured to incline the two or more of the plurality of segments into a projecting position of 60° or more with respect to the water surface.

5. The ship model of claim 4, wherein the multi-joint arrangement and the two or more of the plurality of segements are configured to set one of the two or more of the plurality of segments into an upright position and to lower that segment below the water surface while maintaining the upright position.

6. The ship model of claim 5, wherein the segment arranged upstream of the one of the two or more of the plurality of segments having the upright position is held in a position increasing obliquely rearwardly.

7. The ship model of claim 6, wherein the two or more of the plurality of segments each comprise a keel line and the segment arranged upstream has the keel line projecting downwardly with respect to the keel lines of the remaining two or more of the plurality of segments.

8. The ship model of claim 7, wherein the ship model is held in a tank with a bottom, and one or more of the plurality of segments in a lowered position are supported by the tank bottom, the tank bottom comprising an upwardly facing slanted surface with a top that is offset in a step-like manner toward the top to support the segment arranged upstream when sunk under the water surface.

9. The ship model of claim 1, wherein the elongated hull is divided into at least two segments.

10. The ship model of claim 1, wherein the elongated hull is divided into at least four segments.

11. The ship model of claim 1, wherein the elongated hull is movable into a controlled, contiguous slanted position in a manner that the elongated hull is partially disposed below the water surface.

12. The ship model of claim 1, wherein:
one or more of the plurality of segments comprise a buoyancy tank configured to be variably filled or emptied; and
a position change in the one or more of the plurality of segments is effected by variably filling or empting of the respective buoyancy tank.

13. The ship model of claim 1, wherein the ship model is held in a tank with a bottom, and one or more of the plurality of segments in a lowered position are supported by the tank bottom.

14. The ship model of claim 13, wherein the tank has a depth of less than 40 meters and the ship model has a length of more than 200 meters.

15. The ship model of claim 1, wherein the ship model is arched over by a hall-like cover and different visual scenes can be projected onto the hall-like cover.

16. The ship model of claim 1, wherein the ship model is configured as a passenger ship.

17. The ship model of claim 1, wherein the ship model is configured at a scale of 1:2 or 1:1.

18. The ship model of claim 1, wherein the bow and at least one mid-segment configured to be lowered below the water surface are further configured to each be returned to the floating position on the water surface.

19. A method of simulating a sinking of a ship in which a ship model is sunk below a water surface, comprising:
simulating a sinking ship by a ship model divided into a plurality of segments;
moving the ship model into an overall slanted position, thereby pressing a part of the ship model below the water surface;
completely sinking a first segment below the water surface; and
moving the first segment into an upwardly pivoted position with respect to the next segment.

20. The method of claim 19, further comprising a step of completely sinking of the next segment following the complete sinking of the first segment and moving the next segment into a position pivoted upward with respect to another next segment adjoining toward a stern.

21. The method of claim 19, further comprising connecting two or more segments to one another via a multi-point arrangement and, during sinking simulation, moving the segment disposed at a stern of the ship model into an upwardly projecting position inclined by more than 60° with respect to the water surface.

22. The method of claim 21, further comprising lowering the segment that is set upright in the upwardly projecting position below the water surface.

* * * * *